United States Patent Office 3,197,284
Patented July 27, 1965

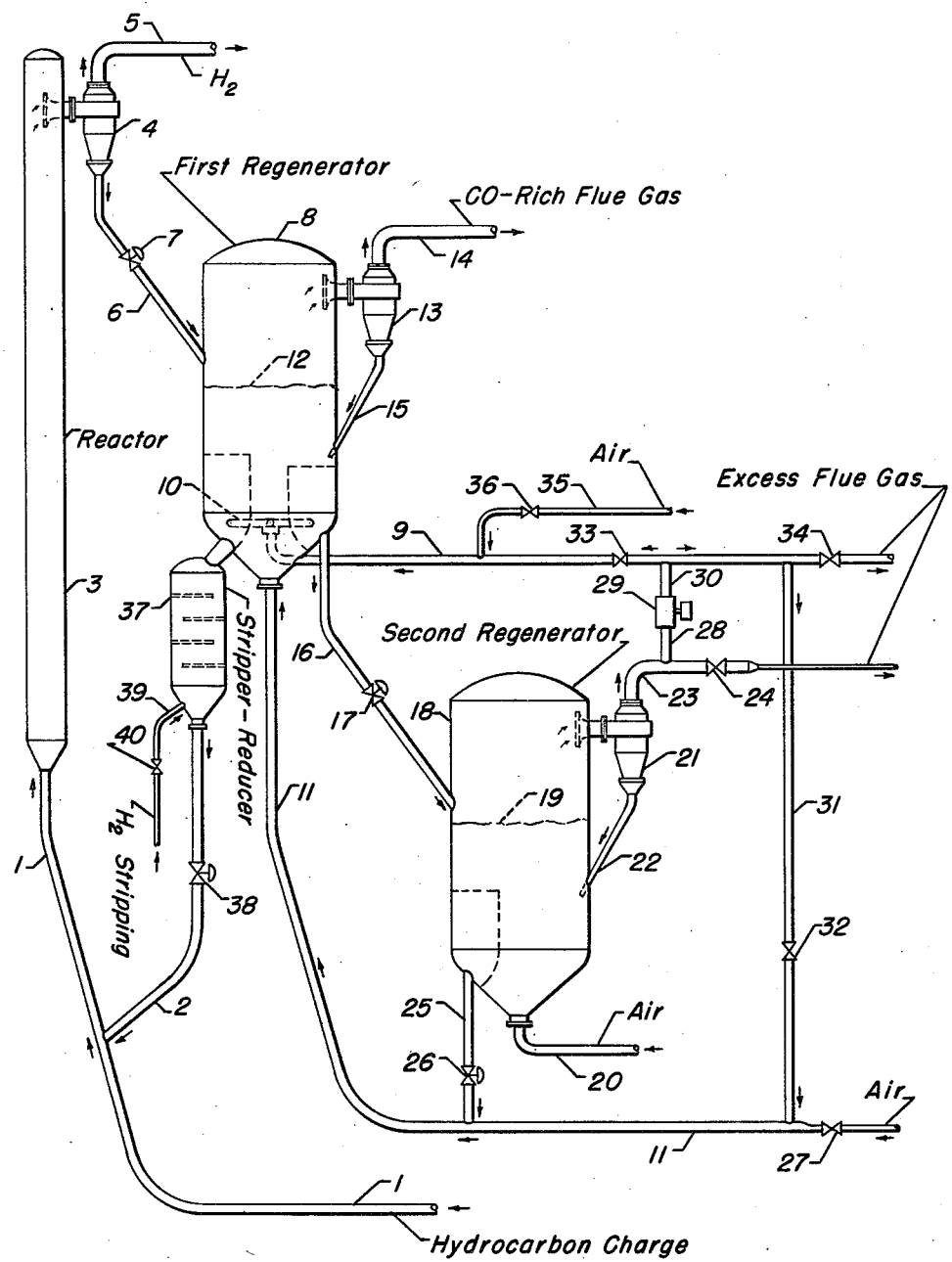

3,197,284
FLUIDIZED CATALYTIC HYDROGEN
PRODUCTION
James Hoekstra, Evergreen Park, Ill., assignor to Universal Oil Products Company, Des Plaines, Ill., a corporation of Delaware
Filed Aug. 4, 1961, Ser. No. 129,330
4 Claims. (Cl. 23—212)

This invention relates to an improved fluidized system for effecting the production of hydrogen by the cracking of methane or other hydrocarbon stream. More specifically, the improved operation is directed to the use of two separate catalyst regenerating zones such that there is controlled carbon removal and controlled carbon dioxide production carried out in one zone while a more complete carbon removal is effected in a second zone so as to regulate the heat balance in the system and preclude excessive carbon build-up on the catalyst.

Fluidized process systems, such as fluidized catalytic cracking units converting gas oil to cracked gasoline customarily effect heat control at the reactor by varying the heat of the hydrocarbon feed stream with preheater means as well as by varying the rate of circulation of hot catalyst particles from the regeneration zone to the reaction zone. Such units readily operate in "heat balance," with the resulting regenerated catalyst particles after carbon removal being at a temperature to adequately supply the endothermic heat of conversion for the charge stream to the reactor. However, in carrying out a fluidized catalytic hydrocarbon cracking operation to produce a high yield of hydrogen with a minimum of carbon oxides, it is necessary to utilize a much higher temperature level, generally above about 1200° F. and at the same time closely control the regenerating step so as to preclude excessive carbon dioxide production and oxidation of the activating metal constituent of the catalyst while in the regenerating zone.

By way of further comparison, in a catalytic cracking unit producing gasoline, it is conventional to remove substantially all of the carbon deposit on the catalyst such that the regenerated carbon level is below about 0.5% by weight. Higher carbon levels tend to cause a poor product distribution and undesired larger quantities of gas and coke in the reaction zone. Conversely, carbon levels in a hydrogen producing unit may be carried well above 0.5% by weight and within the range of from 1% to 8%, or higher. Still further, it has been found to be of advantage to strip regenerated catalyst particles, rather than the catalyst particles passing from the reaction zone, so that carbon oxides, particularly carbon dioxide, is prevented from passing to the reaction zone to dilute the product stream and such that the activating component of the catalyst is not in a highly oxidized state when passed to the reaction zone.

It is a principal object of the present invention to provide a continuous fluidized system for cracking a hydrocarbon stream to hydrogen and coke with a low carbon oxide formation in the reaction zone and a high ratio of carbon monoxide to carbon dioxide formation in the regenerating zone whereby to have reducing gas streams from both zones.

It is also an object of the present invention to provide a two-zone regeneration system for the catalyst in a manner permitting the maintenance of a substantially reducing atmosphere in the first zone and an oxidizing atmosphere in the second zone whereby to control carbon level on the catalyst particles while simultaneously precluding the transfer of catalyst to the reaction zone in an oxidized state.

In one embodiment, the present invention provides a continuous method of cracking a hydrocarbon charge stream to produce a hydrogen product stream substantially free of carbon oxides in a manner which comprises, contacting subdivided catalyst particles, which have been heated and treated as hereinafter set forth, with a hydrocarbon charge stream in a confined reaction zone at a temperature and conditions effecting the cracking of such stream to hydrogen and carbon, recovering a gaseous hydrogen product stream from the resulting contacted particles, passing the latter to a first confined regeneration zone and therein contacting said particles with a gaseous stream of controlled oxygen content obtained in part from a second regeneration zone to effect the removal of only a portion of the carbon deposit therefrom, continuously withdrawing a stream of partially oxidized catalyst particles from said first regeneration zone and effecting the contact thereof in a second confined regeneration zone with an excess of oxygen supplied in a gaseous oxygen containing stream being continuously introduced thereto whereby to remove substantially the entire carbon deposit from said particles, separating the resulting carbon dioxide and oxygen containing flue gas stream from the particles subsequent to the contact in the second regeneration zone and passing such resulting flue gas stream to said first regeneration zone as at least a part of the aforesaid gaseous stream being introduced thereto, returning the further oxidized catalyst particles to said first regeneration zone and recontacting therein in the presence of the oxygen deficient reducing atmosphere maintained therein, and continuously withdrawing resulting regenerated catalyst particles from said first regeneration zone and passing them to said reaction zone to contact the hydrocarbon charge stream as aforesaid.

It is not intended to limit the cracking operation of the present invention to any one specific type of catalyst inasmuch as various sizes and types of catalytic materials may be well utilized in the present improved system. The preferred catalyst, of course, is one which is physically capable of withstanding the high conversion and regeneration temperatures which are encountered in a continuous hydrogen-producing plant wherein temperatures may reach the order of 1700° F. or slightly higher and yet not be excessively abrasive. Refractory catalyst base materials such as silica-alumina or silica with zirconia, or one or more oxides of magnesium, titanium, and the like, or alternatively, alumina with oxides of chromium, molybdenum, vanadium, etc. Preferably, one or more metals or metal oxides of Group VIII metals of the Periodic Chart are utilized as effective in hydrogen formation. Thus, nickel, iron or cobalt compounds may be advantageously used on a refractory base material such as silica-alumina. The size of the catalyst particles must be such that a fluidized contact may be carried out throughout the conversion unit and such that the particles may be readily transported in a fluidized manner. Generally, catalyst particles less than about 2 millimeters should be used, and preferably microspherical or macrospherical particles of between 0.01 and 0.8 millimeter diameter are effective and efficiently used in the fluidized system.

In order to minimize the carbon oxides content in the reactor product, it is necessary to effect efficient stripping and removal of flue gas from particles passing from the regenerator to the reactor section. Nitrogen or other inert gaseous mediums may be used to strip the catalyst particles and preclude the passage of carbon monoxide or metallic oxides which may be present within the regeneration zone such that there is no reducing effect in the conversion zone. In a preferred operation, a portion of the hydrogen product stream from the reaction section is utilized as a stripping medium to contact the catalyst particles from the regeneration zone; however, in such an operation the quantity of the hydrogen containing stripping stream must be closely controlled to preclude excessive quantities of hydrogen from entering the regeneration zone.

It is a feature of the present improved operation to limit the oxygen addition to the first regeneration zone in order to control the carbon burning and whereby to in turn provide a desired temperature level for the catalyst particles which are to be returned to the reaction zone carrying the endothermic heat of conversion. In an operation which burns substantially all of the carbon from the catalyst particles in a single regeneration zone, there results excessive heating of the catalyst particles over that required for the hydrogen conversion reaction, as well as the formation of a large quantity of carbon dioxide in the regeneration zone from the oxidizing conditions existing in the regeneration zone and a resulting oxidized catalyst returning to the reaction zone. For example, where methane is being cracked to hydrogen and carbon in the presence of hot regenerated particles it has been determined that the burning to carbon monoxide, in the regeneration zone, of substantially all of the carbon formed in the cracking reaction rather than burning to carbon dioxide, will provide a substantially heat balanced operation. But, on the other hand, if the carbon is burned to carbon dioxide in the regeneration zone, then there is produced an excessive quantity of heat within the zone and catalyst particles at an excessive temperature are returned to the reaction zone. Thus, in accordance with the preferred operation of this present system, a stoichiometric quantity of oxygen is introduced into the first regeneration zone to maintain a desired heat balance and carbon burnoff level. The first carbon which is removed is that which is most reactive and relatively easy to remove, however, the remaining portion of the carbon on the catalyst particles is of a more dense, less reactive nature and can build up and destroy the activity of a metal activated catalyst. Thus, in accordance with the present invention, means is provided for removing substantially all of the carbon build-up by transferring a continuous stream of partially regenerated catalyst particles to a second regeneration zone wherein they are subjected to an air or other oxygen containing stream to more completely burn carbon from the catalyst. The catalyst from the secondary regeneration zone is then returned to the first zone where the metal oxide activating component is reduced by the carbon monoxide atmosphere of the first regeneration zone prior to being returned to the reaction zone. Also, in a preferred operation, the discharge gas from the secondary regeneration zone, containing substantial amounts of carbon dioxide and unused oxygen, is blended with additional air, as may be necessary, and supplied to the first regeneration zone where the more reactive carbon on the catalyst particles passing from the reaction zone will assist in reducing the carbon dioxide rich flue gas stream to carbon monoxide. The over-all advantage of the present process is, of course, a system for substantially removing or controlling carbon build-up from the catalyst without creating an unfavorable heat balance in the unit and without producing carbon oxides in the reaction zone.

Still further advantages and features of the improved fluidized operation with two zones of regeneration will be apparent upon reference to the accompanying diagrammatic drawing and the following description thereof.

Referring now to the drawing, there is shown a line 1 adapted to transfer a methane or other hydrocarbon charge stream into admixture with hot catalyst particles descending from line 2 and then introduce the mixture into the elongated reactor 3. The hydrocarbon charge stream may, if desired, be preheated prior to entering into admixture with the catalyst particles, with such preheating being effected by heat exchange with a product stream from the system or by the use of conventional heater apparatus. Catalyst particles are carried by the gaseous or vaporous hydrocarbon charge stream in a rising dilute phase column through the entire height of the reactor 3 and into particle separator 4. The rate of introduction of the charge and the amount of catalyst mixed therewith is correlated to provide a desired conversion time and temperature effecting a high yield of hydrogen from the upper portion of the reactor. The hydrogen product stream is separated from the catalyst particles in separator 4 and discharged by way of line 5. Resulting contacted and coked particles from the lower portion of separator 4 pass in a descending line 6, having valve 7, to a first regenerating zone 8.

In accordance with the present improved system, the catalyst particles within the first regenerator 8 are contacted with a gaseous stream of controlled oxygen content so as to preclude burning the entire carbonaceous deposit to carbon dioxide. Two regenerating streams are indicated as entering reactor 8 in the present embodiment. A line 9 connecting with distributing means 10 inside regenerator 8 is supplied with a carbon dioxide and oxygen containing flue gas stream obtained from a second regeneration zone 18, while another line 11 connecting with the lower portion of regenerator 8 is adapted to transfer a catalyst lift stream having a controlled quantity of air or oxygen. The latter stream may comprise a composition similar to that being introduced by way of line 9, or may actually consist of all or a portion of the same carbon dioxide and oxygen containing flue gas stream being obtained from the second regeneration zone. Within the regenerator 8, there is, thus, carried out the controlled contacting and burning of carbon from the contacted catalyst particles in a fluidized bed 12 such that there is a reducing atmosphere resulting within this first regeneration zone and a predetermined desired heat level providing for the return of heated catalyst particles to the reaction zone at an optimum temperature. A carbon monoxide rich flue gas leaves the upper portion of the chamber 8 by way of particle separator 13 and outlet line 14 while entrained catalyst particles return, by way of line 15, to the dense phase bed 12 in the regenerator 8.

A quantity of catalyst particles from the interior of the first regeneration zone 8 are continuously withdrawn from the bed 12 by way of transfer line 16 having control valve 17 to enter a second stage of regeneration in a fluidized bed of particles 19 within chamber 18. An excess quantity of air or other oxygen containing gaseous stream is continuously introduced into the second regenerator 18 by way of line 20, such that the fluidized bed of catalyst particles therein, still having a high level of carbon, are contacted and further oxidized to effect the removal of substantially all of the carbonaceous deposit. A resulting flue gas stream, containing carbon dioxide and unused oxygen, is continuously discharged from the upper portion of chamber 18 into an adjoining particle separator 21. The latter provides for the return of entrained particles by way of line 22 and the discharge of a substantially particle free flue gas stream by way of line 23 having control valve 24. Resulting substantially free carbon particles from the interior of the second regenerating zone 18 are continuously withdrawn by way of transfer line 25, having valve 26, and admixed with a gas lift stream passing through line 11 to thus be returned to the first regeneration zone 8. As indicated diagrammatically, the riser line 11 may be provided with air introduced through control valve 27, a portion of the flue gas stream being discharged from the upper end of chamber 18 by way of line 23, or a mixture of the two streams. Flue gas from the outlet line 23 can pass into a line 28, a compressor 29, line 30 and line 9. Line 9 is connective with a transfer line 31, having valve 32, which in turn connects with riser line 11, so as to supply fluidizing gas to the latter. Line 9 is provided with control valves 33 and 34 that are positioned, respectively, each side of the connection between line 30 and line 9 whereby to regulate the direction of flow of the flue gas from line 23 such that it is directly into line 9 and the first regenerator 8, or indirectly by way of lines 9 and 31 to the riser line 11. Excess flue gas may also be discharged from the system by way of either line 9 or line 23. Where it is necessary to utilize substantially all of the flue gas stream from the second regeneration zone 18 as a lifting gas, then such flue gas stream is transferred by way of interconnecting lines to the lower end of riser line 11 so as to aid in fluidizing particles passing from standpipe 25. Also, in order to provide versatility in the operation of the unit, provision is made to introduce air into the first stage of regeneration either by line 11 through valve 27 or by way of line 35 and valve 36 into line 9 and thence into the distributor 10 within the lower portion of the first regenerator 8. Generally, it will be found unnecessary to add air through line 9 and line 11; however, provision is made such that a small quantity of air may be introduced through each line separately, or at the same time, if desired.

The catalyst particles re-entering the first regenerator 8 with a low level of carbon, from the second stage of regeneration, become intermingled with catalyst particles in bed 12 so that there is actually a continuous mixture of catalyst particles having a low level of carbon and a relatively high level of carbon. In any case, the entire fluidized mixture maintained in the first regeneration zone 8 is under substantially reducing conditions by virtue of the high carbon monoxide content resulting in the gaseous stream passing upwardly through bed 12. As previously pointed out, the carbon dioxide which is introduced into the first regenerating zone 8, from the second regenerating zone 18, is subjected to reduction in the presence of the reactive carbon on the catalyst particles in the first regeneration zone 8, whereby to provide a still greater quantity of carbon monoxide to combine with that being formed by the partial oxidation of the carbon in the presence of a controlled quantity of oxygen.

Resulting regenerated and heated catalyst particles are continuously withdrawn from the first regeneration zone 8 by way of stripping section 37 and transfer line 2 having control valve 38. The catalyst particles in the "treated" state may be further subjected to a stripping step in a stripping section 37 such that there are no carbon oxides entrained with the catalyst particles and such that there may be no highly oxidized state to the activating component of the particles just prior to introducing them into reactor 3. Various types of stripping agents may be utilized in section 37, including inert mediums such as nitrogen or steam, or a carbon monoxide rich stream, however, preferably a hydrogen containing stream is introduced by way of line 39 and valve 40 to effect the stripping of the catalyst particles, with such hydrogen stream being a portion of the product stream that is discharged by way of line 5 from the upper portion of reactor 3 and separator 4.

By way of further illustration of the present improved system, where a natural gas or other hydrocarbon stream is introduced by way of line 1 into the reaction zone 3, there will be a contact with hot regenerated catalyst particles at a temperature range above about 1200° F. and up to the order of 1700° F. whereby to provide approximately equilibrium conversion to hydrogen. Thus, the only other material of any quantity in the product stream comprises methane, there being very little, if any, carbon oxides present. Separated carbon containing catalyst particles pass from the reactor 3 to the first regenerator 8 and are contacted therein with the diluted air or oxygen stream to provide a partial removal of carbon and resulting heated catalyst in the temperature range of from about 1275° F. to 1800° F., such that the desired temperature of hydrocarbon conversion will be attained in the reactor 8. Generally, with an active catalytic material the temperature will be less than about 1400° F. in the reactor.

Operating in accordance with the present improved two-stage regeneration procedure, catalyst particles with only a portion of the carbon removed are continuously passed from the first regenerator 8 to the second regenerator 18 and therein contacted with excess air to provide substantially complete removal of carbon. The further oxidation results in a temperature range in the second regenerator of from about 1300° F. to 1800° F., depending upon the extent of carbon deposition and the temperature of the gaseous regenerating and fluidizing stream introduced thereto. The total carbon deposition on the particles in turn varies with the charge stream, i.e., as to whether methane or a heavier hydrocarbon is being cracked to hydrogen and carbon. Catalyst with substantially all of the carbon removed is continuously returned to the first reactor 8 and thus commingles with the more highly carbonized catalyst therein, and at the same time effect an averaging of the temperatures therein to result in a predetermined temperature range suitable for transfer to the reaction zone.

Preheating, heat exchangers, and cooling means are not shown in the diagrammatic drawing, however, suitable heat exchange means may, of course, be provided to obtain efficient utilization of available heat in the system. For example, a carbon monoxide burner, or waste heater boiler, may take the discharge of the carbon monoxide-rich stream from the top of the regenerator 18 to in turn provide high temperature steam.

The catalyst circulation rate in the system may be controlled by suitable regulation of the slide valves, or other types of control valves used in connection with the various standpipes or transfer lines from the regenerators. For example, the control valves 38 in standpipe 2 may be operated responsive to temperature control means located in reactor 3. Also, the rate of circulation for catalyst particles between the first and second regeneration zones may be regulated by control valves 17 and 26, in turn operating responsive to level control means in association with the respective regenerators 8 and 18.

The drawing in the foregoing description indicates that the operation is effected in a fluidized manner; however, a suitable catalytic conversion system may be carried out by the use of a non-fluidized moving bed operation wherein the catalyst particles are of a larger size and of a type capable of being transferred by a fluidized or mechanical lift means as well as by gravity flow. Also, in an alternative design or operation of a fluidized system, the reaction zone may operate with the use of a dense phase bed, such that there is a dense phase bed of catalyst particles superimposed by a light phase zone of catalyst particles in an enlarged diameter chamber, rather than operating in entirely a dilute phase manner as indicated by the present small diameter upflow reactor 3. In other words, it is not intended to limit the scope of the present improved continuous hydrogen producing system to the use of any one speicfic apparatus embodiment for carrying out the desired catalytic conversion with two-stages of catalyst regeneration in combination therewith.

I claim as my invention:

1. A continuous method for cracking a hydrocarbon charge stream to produce a hydrogen product stream substantially free of carbon oxides, which comprises, contacting said charge stream in a reaction zone with subdivided catalyst particles, which have been heated and treated as hereinafter set forth, at conditions effecting the cracking of such stream to hydrogen and carbon, recovering a gaseous hydrogen product stream from the resulting contacted particles, passing the latter to a first confined regeneration zone and therein contacting said particles under reducing conditions with a gaseous stream of controlled oxygen content obtained in part from a second regeneration zone at conditions effecting the removal of only a portion of the carbon deposit therefrom, continuously withdrawing a stream of partially oxidized catalyst particles from said first regeneration zone and effecting the contact thereof in a second confined regeneration zone with an excess of oxygen supplied in a gaseous oxygen containing stream being continuously introduced thereto whereby to burn substantially the entire remaining carbonaceous deposit from said particles, separating the resulting carbon dioxide and oxygen containing flue gas stream from the particles subsequent to the contact in said second regeneration zone and passing at least a part of such resulting flue gas stream to said first regeneration zone as at least a part of the aforesaid gaseous stream being introduced thereto, returning the further oxidized catalyst particles from said second regeneration zone to said first regeneration zone and recontacting them therein in the presence of the oxygen deficient atmosphere maintained therein, continuously withdrawing resulting regenerated catalyst particles from said first regeneration zone and introducing them to said reaction zone and in contact with the hydrocarbon charge stream as aforesaid in an amount and at a temperature sufficient to supply the endothermic heat of the cracking reaction in the reaction zone.

2. A continuous method for effecting the fluidized cracking of a hydrocarbon charge stream to produce hydrogen substantially free of carbon oxides, which comprises, introducing said charge stream into admixture with subdivided catalyst particles which have been heated and treated as hereinafter set forth and effecting the fluidized contacting of such particles as they are carried in a dilute phase of upflowing confined column thereof at conditions effecting the cracking of said stream to hydrogen and carbon, passing the resulting contacted stream and catalyst particles into a separation zone and recovering a gaseous hydrogen product stream therefrom, passing separated contacted particles from the separation zone into a first confined regeneration zone and therein effecting a fluidized contacting of said particles under reducing conditions with a gaseous stream of controlled oxygen content obtained at least in part from a second regeneration zone at conditions effecting the removal of only a portion of the carbonaceous deposit therefrom, continuously withdrawing a stream of partially oxidized particles from said first regeneration zone and effecting the fluidized contact thereof in a second confined regeneration zone with an excess of oxygen being supplied with a gaseous fluidized regenerating stream continuously introduced into said second regeneration zone whereby to burn substantially the entire remaining carbonaceous deposit from said catalyst particles, separating a resulting carbon dioxide and oxygen containing flue gas stream from the contact effected in said second regeneration zone and passing at least a part of such flue gas stream to said first regeneration zone as at least a part of the aforesaid gaseous stream being introduced thereto, returning the further oxidized catalyst particles from said second regeneration zone to said first regeneration zone and recontacting them therein in the presence of the oxygen deficient atmosphere maintained therein, continuously withdrawing resulting regeneratad catalyst particles from said first regeneration zone and introducing them into said reaction zone and in contact wtih said hydrocarbon charge stream as aforesaid in an amount and at a temperature sufficient to supply the endothermic heat of the cracking reaction in the reaction zone.

3. The method of claim 1 further characterized in that the catalyst particles passing from said first regeneration zone to said reaction zone are stripped with a countercurrently flowing gaseous stripping medium to remove gaseous carbon oxides prior to contact with said charge stream.

4. The method of claim 3 further characterized in that said gaseous stripping medium comprises at least a portion of said hydrogen product stream being recovered from the reaction zone.

References Cited by the Examiner
UNITED STATES PATENTS

| | | | |
|---|---|---|---|
| 2,690,963 | 10/54 | Herbst | 48—196 |
| 2,714,059 | 7/55 | Bearer | 48—196 |
| 3,017,250 | 1/62 | Watkins | 23—212 X |
| 3,027,238 | 3/62 | Watkins | 23—212 |

MAURICE A. BRINDISI, *Primary Examiner.*